UNITED STATES PATENT OFFICE.

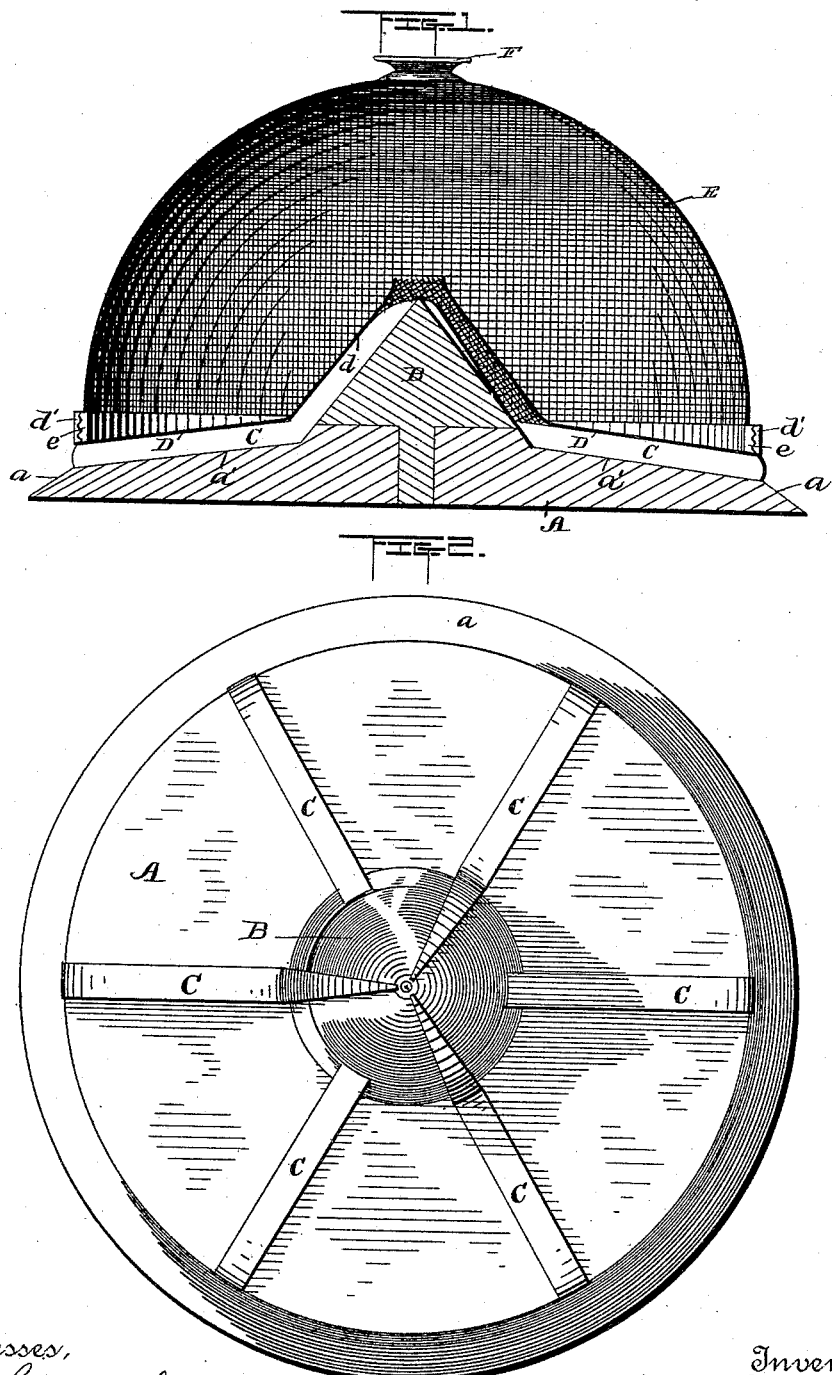

CLARA P. BROWN, OF NEW YORK, N. Y.

INSECT-TRAP.

SPECIFICATION forming part of Letters Patent No. 395,542, dated January 1, 1889.

Application filed November 7, 1888. Serial No. 290,211. (No model.)

*To all whom it may concern:*

Be it known that I, CLARA P. BROWN, of New York, in the county of New York and State of New York, have invented certain new and useful Improvements in Insect-Traps; and I do hereby declare the following to be a full, clear, and exact description of the invention, such as will enable others skilled in the art to which it appertains to make and use the same.

My invention relates to an improvement in insect-traps, and more particularly to traps designed to catch cockroaches.

The object is to provide a simple inexpensive trap which will be effective in entrapping insects at a rapid rate, and which will admit of conveniently destroying them after they have been caught.

With these ends in view my invention consists in certain features of construction and combinations of parts, as will be hereinafter described, and pointed out in the claims.

In the accompanying drawings, Figure 1 is a vertical central section of the trap, and Fig. 2 is a top plan view of the bottom of the trap.

A represents the bottom of the trap. It is preferably of a circular form, its rim $a$, as it extends upwardly from the lower edge, gradually inclining toward the center to afford an easy ascent for the bug. From the upper edge of the rim the upper surface, $a'$, of the bottom gradually rises as it extends toward the center, and as it nears the center said surface terminates in an upwardly-extending cone, B. The bottom may be formed of a single piece of wood or other suitable material, or the cone portion B may be formed separately and fastened in position, as may be found desirable.

To the upper surface of the bottom a series of radially-extending partition-ribs, C, are secured, the height of which is just sufficient to admit of the free passage of the largest cockroaches or other insects which the trap may be designed for. In the present instance six of the radial ribs C are employed, spaced at equal distances apart. Each alternate rib is continued from the surface $a'$ along up to a point near the apex of the cone portion, the other ribs being stopped short at the base of the cone portion to afford additional passage-room on the surface of the cone.

The bottom D of the cage portion of the trap is preferably formed of wire-gauze. It is fitted to conform to the shape of the upper surface of the bottom A, and is fastened to the upper faces of the ribs C. The apex of its cone portion $d$ is left open to allow the insect to enter the cage as soon as it reaches the apex of the cone portion B. The said cage-bottom D is provided with an annular rim, $d'$, within which the edge $e$ of the top portion, E, of the cage snugly fits.

By providing the thin metallic rim $d'$ with screw-threaded corrugations and the edge $e$ of the top of the cage with corresponding corrugations the top portion, E, may be conveniently screwed into position, and the trap may then be safely handled by a knob, F, at the top. Other well-known and approved means— such as a spring-catch or bayonet-catch— might be employed to fasten the top E to the bottom D instead of the screw-thread arrangement shown.

By the above construction the bugs are admitted from every direction onto the bottom A, and as soon as they enter they are prevented from wandering around to the right or left and perhaps out again by the partition-ribs C, which guide them to the base of and along up the sides of the cone portion B to its apex, where they pass directly through the opening in the apex of the cage-bottom D into the cage. The cone portion B, being a continuation of the surface of the bottom A, does away with the necessity of the bug turning over and crawling with his back downward along the under surface of the wire-gauze cone $d$, and the passage of the bug from the bottom A to the interior of the cage is thereby greatly facilitated.

Experience has shown the trap to be very effective, and its flat shape renders it a simple matter to scald the bugs caught therein.

It is evident that slight changes might be resorted to in the form and arrangement of the several parts described without departing from the spirit and scope of my invention; hence I do not wish to limit myself strictly to the construction herein set forth; but,

Having thus fully described my invention, what I claim as new, and desire to secure by Letters Patent, is—

1. In an insect-trap, the combination, with a cage portion having a cone extending upwardly from its bottom and open at its vertex, of a plurality of passage-ways leading from the periphery of the bottom to the said cone portion to the vertex thereof, substantially as set forth.

2. In an insect-trap, the combination, with a cage portion having a cone extending upwardly from its bottom and open at its vertex, of a bottom located below the bottom of the cage portion and spaced therefrom, said bottom provided with a cone projecting upwardly within the cone of the bottom of the cage portion, said cone provided with a plurality of passage-ways leading from its base to its vertex, substantially as set forth.

3. In an insect-trap, the combination, with a cage portion having a cone extending upwardly from its bottom and open at its vertex, of a bottom located below the bottom of the cage portion and provided with a conical projection extending upwardly within the cone of the cage portion, the two bottoms and cone portions being spaced apart by a set of radial partitions, substantially as set forth.

4. In an insect-trap, the combination, with a cage portion having a cone extending upwardly from its bottom and open at its vertex, of a bottom located below the bottom of the cage portion and provided with a conical projection extending upwardly within the cone of the cage portion, the two bottoms and cone portions being spaced apart by a set of radial partitions, a series of which terminate at the base of the cone, substantially as set forth.

In testimony whereof I have signed this specification in the presence of two subscribing witnesses.

CLARA P. BROWN.

Witnesses:
JOHN G. WEIGOLD,
PATRICK F. MANON.